April 24, 1951 K. W. PFLEGER 2,550,596

EQUALIZER FOR TRANSMISSION LINES

Original Filed Nov. 18, 1947 5 Sheets-Sheet 1

INVENTOR
K. W. PFLEGER
BY Hugh S. Wertz
ATTORNEY

April 24, 1951 K. W. PFLEGER 2,550,596

EQUALIZER FOR TRANSMISSION LINES

Original Filed Nov. 18, 1947 5 Sheets-Sheet 2

INVENTOR
K. W. PFLEGER
BY Hugh S. Wertz
ATTORNEY

INVENTOR
K. W. PFLEGER
BY Hugh S. Wertz
ATTORNEY

EQUALIZER FOR TRANSMISSION LINES

Original Filed Nov. 18, 1947

INVENTOR
K. W. PFLEGER
BY
Hugh S. Wertz
ATTORNEY

April 24, 1951 K. W. PFLEGER 2,550,596

EQUALIZER FOR TRANSMISSION LINES

Original Filed Nov. 18, 1947 5 Sheets-Sheet 5

INVENTOR
K. W. PFLEGER
BY
Hugh S. Wertz
ATTORNEY

Patented Apr. 24, 1951 2,550,596

UNITED STATES PATENT OFFICE 2,550,596

EQUALIZER FOR TRANSMISSION LINES

Kenneth W. Pfleger, Arlington, N. J., assignor to Bell Telephone Laboratories, Incorporated, New York, N. Y., a corporation of New York Original application November 18, 1947, Serial No. 786,745. Divided and this application July 19, 1949, Serial No. 105,518

4 Claims. (Cl. 178—44)

This invention relates to electric circuits and more particularly to circuits for equalization of waves transmitted over transmission lines or other media. This application is a division of application Serial No. 786,745, filed November 18, 1947.

It is an object of this invention to improve the equalization of wide band signals and especially of those signals transmitted over a path which is so long electrically as to cause phase shifts between components of different frequencies.

The transmission of television signals involves many problems in consequence of the relatively wide band of frequencies over which the signals are spread. Not the least of these problems is that of equalizing or compensating for phase variations caused, for example, by temperature changes on transmission line circuits carrying these wide band signals. It has previously been proposed to provide basic compensation for such phase variations by the use of equalizing networks which introduce fixed envelope delay ($d\beta/d\omega$) into the system and to further compensate for these variations by providing adjustable delay equalizers in conjunction with the fixed delay equalizers. After all this equalization, on long broad band cable circuits there still might remain small variable "humps" in the loss versus frequency and envelope delay versus frequency characteristics. The present invention relates to what is called "mop-up" equalization, that is, equalization of these small variable "humps" remaining after the usual equalization has been made.

In a system disclosed in Patent 2,379,744, issued July 3, 1945, to K. W. Pfleger, auxiliary signals or waves transmitted over pilot channels (three are given by way of example) are utilized to operate continuously adjustable networks consisting of stationary impedance elements. The impedance of each of the adjustable elements is changed by means of a current of varying intensity caused to be varied in accordance with the phase difference of two waves of the same frequency ($F_0$) obtained respectively by demodulating two modulated waves transmitted over the television line, each comprising a pilot frequency (a different one for each one of the waves) modulated by the fixed frequency $F_0$ which is lower than either of the pilot frequencies. The two demodulated waves of the frequency $F_0$ are applied to a push-pull phase detector after having been initially adjusted by phase shifters to be in quadrature. As long as this phase relation is maintained, the output of the phase detector is zero, regardless of level changes on the television line. When the phase relation between the two demodulated waves changes due to variations in delay over the line, the balance is destroyed and the output current of the phase detector has an appreciable magnitude in one direction or the other. When the phase relation between the input currents for the phase detector changes in the opposite direction, the direction of output current is reversed. These output currents are, as pointed out above, utilized to control the impedances of variable elements in an adjustable equalizer. A first pilot frequency $F_1$ is located at or slightly below the lower edge of the television band, a second pilot frequency $F_2$ is located about in the center of the band (preferably in a dead portion of the television band), and a third at or slightly above the upper edge of the television band. The delay distortion over the frequency range $F_1$ to $F_2$ is corrected with the aid of one of the phase detectors while the distortion over the frequency range $F_2$ to $F_3$ is corrected with the aid of the second phase detector. In the system described in the above-mentioned Pfleger patent, the sidebands are transmitted over the cable or other path and utilized with the pilot frequency waves at the receiving end to produce waves at the envelope frequency which waves are applied to the phase detectors.

In a "mop-up" equalizer utilizing an adjustable attenuator or equalizer in accordance with the present invention (the "mop-up" equalizer in one of its aspects being a special case of and an extension of the patented Pfleger arrangement), both automatic delay distortion and automatic attenuation distortion are compensated by the same pilot frequencies, of which a great number are provided, they preferably being located throughout the television band at intervals corresponding to the line scanning frequency of the television image. Due to the relatively close spacing of the pilot frequencies, only the latter need be transmitted and the step of modulation (in the above-identified patented arrangement) is not necessary. The pilot frequencies are utilized at the receiving station to vary the magnitudes of "humps" of loss which are inserted into the system at the proper frequencies to give substantially flat compensation of the attenuation versus frequency and envelope delay versus frequency characteristics.

In accordance with the present invention, there is provided an attenuator or equalizer comprising a multiplicity of parallel-connected branches each comprising a band-pass filter tuned to a different pilot frequency and adapted to pass a nearly sinusoidal "hump" symmetrical around the tuned frequency, a fixed delay equalizer for compensating for any delay in the filter and a variable resistor element (which may be a thermistor) for varying the intensity of the "hump." The equalizer can be in two sections, one for the odd-numbered pilot frequencies and one for the even-numbered ones.

The invention will be more readily understood by referring to the following description taken in connection with the accompanying drawings forming a part thereof in which.

Figure 9:
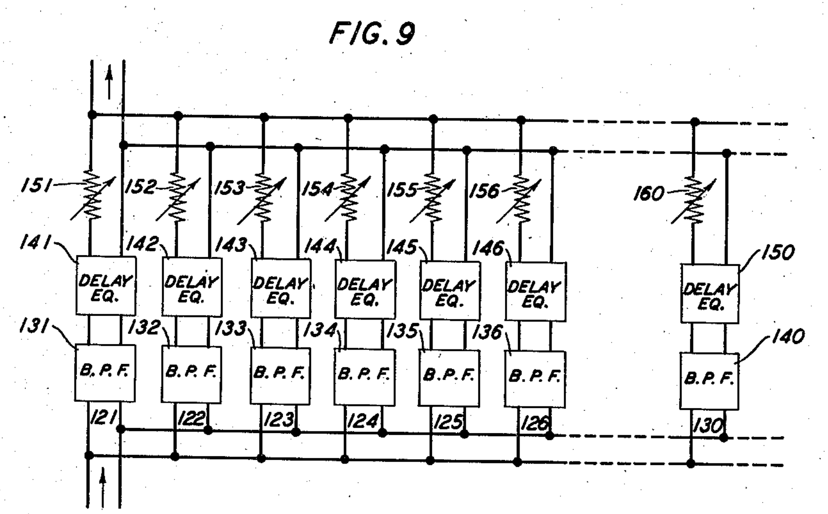
Fig. 9 is a schematic block diagram of an attenuation equalizer in accordance with the invention which produces practically no delay distortion.

Referring more specifically to the drawings, Fig. 9 shows an exemplary embodiment of an attenuation equalizer in accordance with the invention. In order to illustrate the manner, use and advantages of such an equalizer, however, reference will first be made to Figs. 1 and 2 which show, in block diagram form, sending and receiving end portions 10 and 11, respectively, of a television system in which mop-up equalization of loss and envelope delay are employed. For simplicity in the drawings, details of the equipment for generating, transmitting and utilizing the video signal at the receiving station to produce an image of the object have not been shown since the present invention is concerned primarily with the loss and delay equalization of the television signals.

Figure 1:
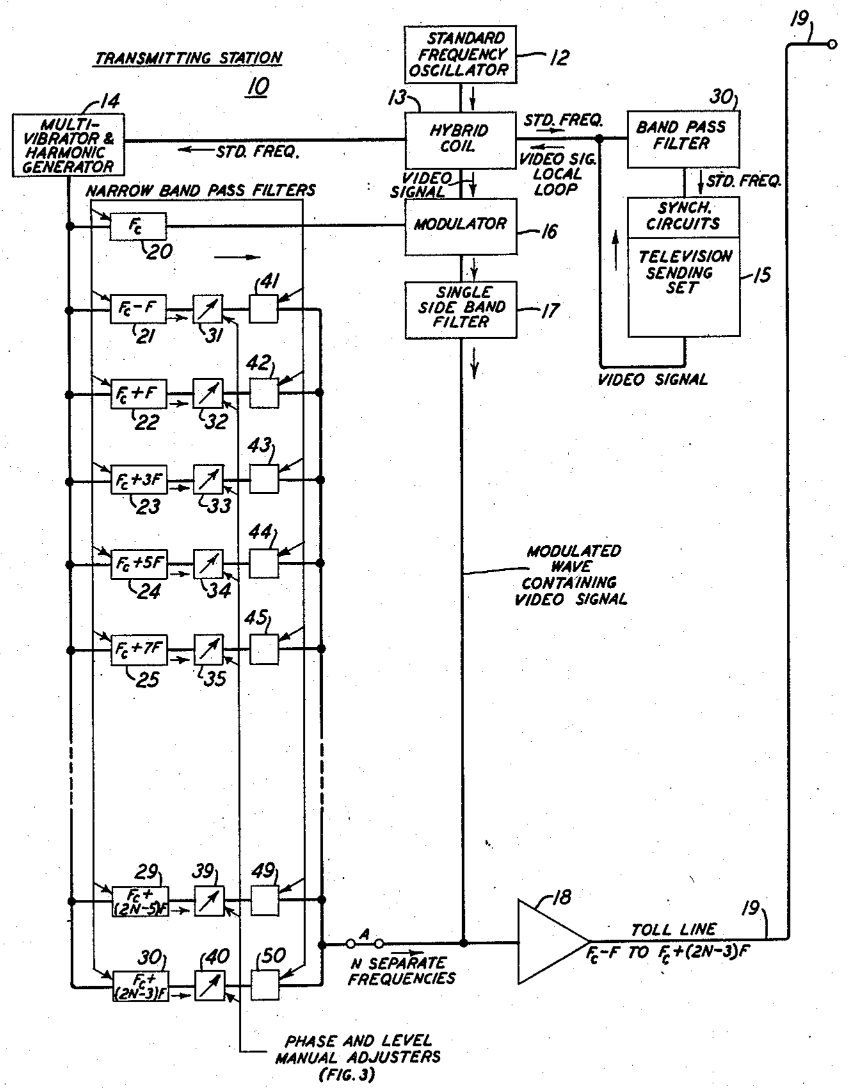
Fig. 1 is a schematic block diagram of a portion of the sending end apparatus of a television system including the sending end equipment of a "mop-up" equalizer embodying an adjustable attenuator or equalizer in accordance with the invention.

Referring first to the sending end equipment 10 shown in Fig. 1, a standard frequency oscillator 12 generates oscillations of, for example, 1000 cycles per second, and this generated wave is applied through a hybrid coil 13 to a multivibrator and harmonic generator 14 of any suitable form to produce a group of accurate frequency waves. (The standard frequency wave can also be applied through the filter 30 to the synchronizing circuits forming part of the television sending set 15, for control purposes.) By means of a multiplicity (for example there might be 191 for television having 441 lines and 30 frames per second) of narrow band-pass filters 20, 21, 22, 23, 24, 25 . . . 29, 30 tuned to frequencies separated by a frequency of 13.23 kilocycles (the line scanning frequency), a multiplicity of frequencies are selected as follows: $F_c$ (carrier frequency—for example, 300 kilocycles per second), $F_c-F$ (where F is one-half line scanning frequency), $F_c+F$, $F_c-3F$, $F_c+5F$, . . . $F_c+(2N-3)F$. Where the lower sideband of the television signal is suppressed, it is necessary to transmit relatively few pilot frequencies below $F_c$. The carrier frequency $F_c$ is modulated in the modulator 16 with a video signal passing the hybrid coil 13 from the television sending set 15 and the resultant modulated wave is passed through a single sideband filter 17 and the amplifier 18 to the toll line 19. The selected frequencies $F_c-F$ up to $F_c+(2N-3)F$ are each passed through an individual one of the manually-adjusted phase and level adjusters 31, 32, 33, 34, 35 . . . 39, 40 (to compensate for any phase or level change in the filters). Suitable phase and level adjusters are shown in Fig. 3 and will be described below. Each of the selected frequencies is then passed through an individual one of the narrow band-pass filters 41, 42, 43, 44, 45 . . . 49, 50 to prevent that frequency from interacting with the phase or level adjuster for any of the other frequencies. Then all of the selected frequencies are applied through the amplifier 18 to the toll line 19 and transmitted to the receiving station 11 shown in Fig. 2.

Figure 2:
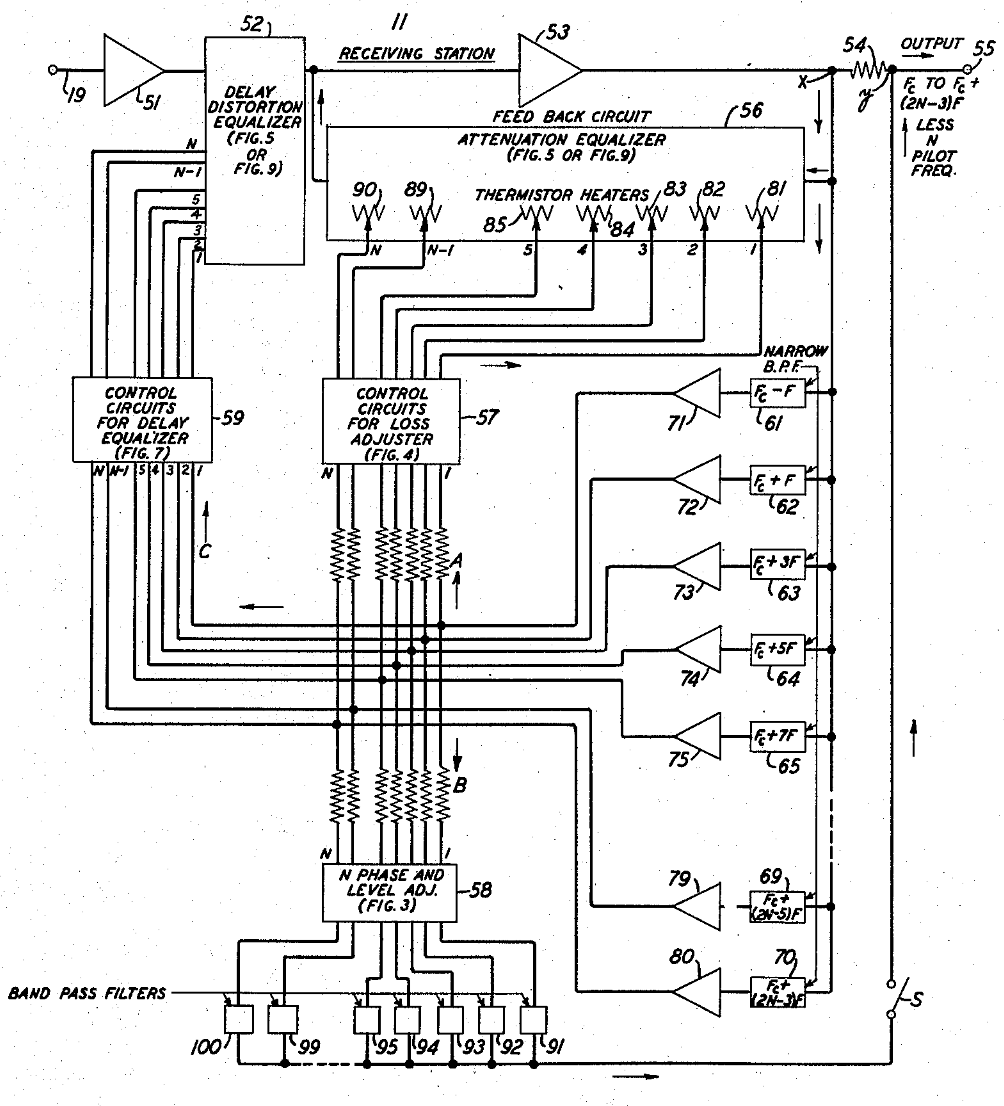
Fig. 2 is a schematic block diagram of receiving end apparatus adapted to be utilized with the sending end equipment shown in Fig. 1.
Figure 3:
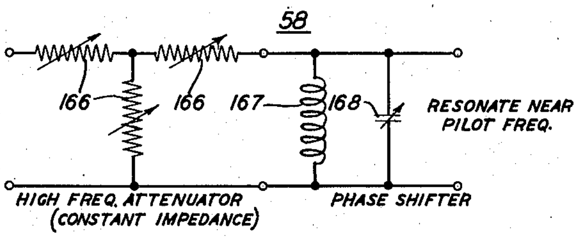
Fig. 3 is a circuit diagram of one of the manual level and phase adjusters forming part of the equipment shown in Fig 1 and Fig. 2.

At the receiving station 11 of Fig. 2, all of the selected (pilot) frequencies ($F_c-F$ to $F_c+(2N-3)F$, inclusive) as well as the transmitted modulated wave containing the video signals are passed through an amplifier 51 and then through a delay distortion equalizer 52 (which will be described more fully below in connection with Fig. 5 or Fig. 9) and another amplifier 53. The output current of the amplifier 53 is divided into three parts as follows: (1) a portion going through a resistance pad 54 to an output circuit terminal 55 to which are applied (by means to be described below) the pilot frequencies to oppose those in the amplifier 53 and thus leave only the transmitted modulated wave containing the video signal, (2) a portion going through a feedback circuit containing variable attenuation equalizers 56 (see Fig. 5 or Fig. 9), and (3) a portion going through a multiplicity of parallel circuits each comprising one of the narrow band-pass filters 61, 62, 63, 64, 65 . . . 69, 70 and one of the amplifiers 71, 72, 73, 74, 75 . . . 79, 80. The output current from each of the last-mentioned amplifiers is then divided into three parts, (1) a portion (A) going through an individual one of the control circuits 57 for the loss adjuster (which circuits will be described more fully below in connection with Fig. 4) which varies the current through an individual one of the thermistor heaters 81, 82, 83, 84, 85 . . . 89, 90 in one of the attenuation equalizers of the feedback circuit 56, (2) a portion (B) going through individual phase and level adjusters 58 (which will be described more fully below in connection with Fig. 3) and narrow band-pass filters 91, 92, 93, 94, 95 . . . 99, 100 to the output circuit terminal 55 whereby the pilot frequencies are adjusted in phase and amplitude to oppose those in the output circuit of amplifier 53, and (3) a portion (C) going to an individual one of the control circuits 59 (which will be described more fully below in connection with Fig. 7) for varying in each case the power of an individual heater for an individual impedance member of the distortion equalizer 52 shown in Fig. 5 or Fig. 9.

Figure 5:
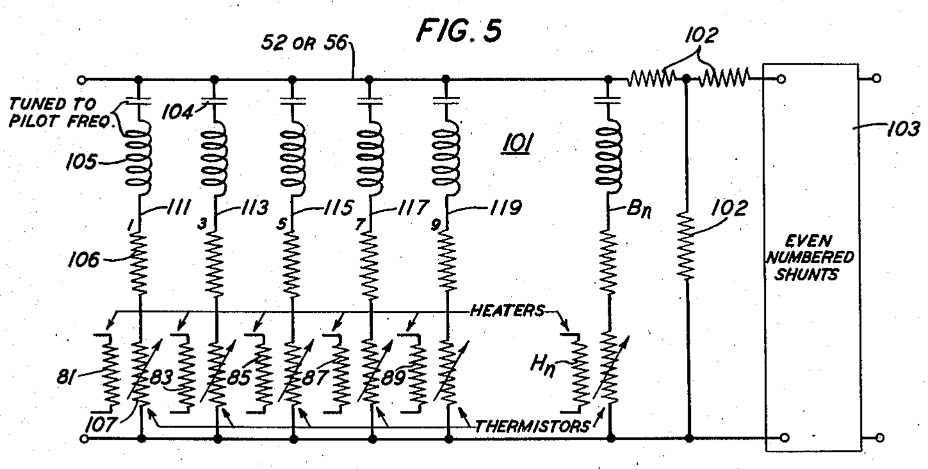
Fig. 5 is a circuit diagram of a group of typical distortion equalizers suitable for use in the arrangement of Fig. 2.

Referring now to Fig. 5, this figure shows one form of equalizer which may be used as the delay distortion equalizer 52 or the attenuation equalizer 56. It comprises a first section 101 consisting of a multiplicity of parallel-connected branches 111, 113, 115, 117 and 119, . . . $B_n$ respectively resonating at a different one of the odd-numbered pilot frequencies and a thermistor, followed after resistance pad 102 by a section 103 like the first section 101 but tuned at the even-numbered pilot frequencies. Considering one of said branches, as, for example, the branch 111, it comprises a capacitor member 104, an inductance member 105, resistance member 106 and a thermistor member 107, the other parallel branches 113, 115, 117, 119, . . . $B_n$, and also those in the even-numbered section 103 are similar to the branch 111 except that the frequency of the tuned circuit varies. By varying the resistance of a particular thermistor 107 by varying the current in its corresponding heater 81, 83, 85, 87, 89, . . . $H_n$, the magnitude of the "hump of loss" inserted into the system at that pilot frequency can be varied. The resultant of the two sections 101 and 103 is substantially flat for the over-all frequency range. As the arrangement shown in Fig. 5 produces both attenuation and delay it can be used either as a delay distortion equalizer 52 or attenuation equalizer 56.

When the thermistors 107 are all at some average value, it is desirable that the receiving circuit of Fig. 2 shall have an over-all flat characteristic. Since the network of Fig. 5 produces peaks of loss (or attenuation) at each odd-numbered resonant frequency, it is necessary to have in connection therewith a similar circuit 103 having the parallel branches thereof tuned to even-numbered pilot frequencies. At average values of the thermistor, the loss "hump" has about the same peak value at all pilot frequencies and the loss characteristic due to the one network is complementary to that of the other so that over-all transmission is flat when all the thermistors are at an average value of resistance. The use of sinusoidal "humps" is advantageous. In general, for average values of thermistors or other possible variables, the odd-numbered network 101 produces an over-all loss, for example, as shown by the dash line curve in Fig. 6. The even-numbered network 103 gives the complementary loss shown by the full line curve so that the resultant is flat for the frequency range of interest. By variations from the average of one or more networks, the resultant can be made to have either narrow or broad "humps" depending on the changes occurring in adjacent channels. On Fig. 6, which is a plot of loss versus frequency, the loss curves for both halves of the equalizer and the resultant have been shifted to refer them to an arbitrary zero loss axis in order to facilitate comparison. A curve similar to Fig. 6 can be drawn for delay versus frequency.

When simple networks of the type shown in Fig. 5 are used for loss equalizers, delay "humps" are also produced and when they are used for delay equalizers, loss "humps" are also produced. Resonant shunts are shown in Fig. 5 merely to illustrate how the pilot channels can control "humps" of loss or delay. In practice, some other form of tuned network might be preferable. As an example of an attenuation equalizer which produces practically no delay distortion, reference will now be made to Fig. 9.

In the arrangement of Fig. 9, there is shown an attenuation equalizer in accordance with the invention which produces substantially no delay distortion. The equalizer of Fig. 9 comprises a plurality of parallel-connected branches 121, 122, 123, 124, 125, 126 . . . 130 each consisting of a respective band-pass filter 131, 132, 133, 134, 135, 136 . . . or 140 tuned to a different pilot frequency and adapted to pass a nearly sinusoidal "hump" symmetrical around the tuned frequency, a respective fixed delay equalizer 141, 142, 143, 144, 145, 146 . . . or 150 for compensating for any delay in the corresponding filter and a respective variable resistor element 151, 152, 153, 154, 155, 156 . . . or 160 (which may be thermistors) for varying the intensity of the "hump." The equalizer of Fig. 9 can also be in two sections like the one of Fig. 5, one section having the odd-numbered branches and the other section having the even-numbered branches. By means of this arrangement, "humps" of correct amount of loss can be inserted into the system at the proper frequency to give substantially flat compensation.

Figure 10:
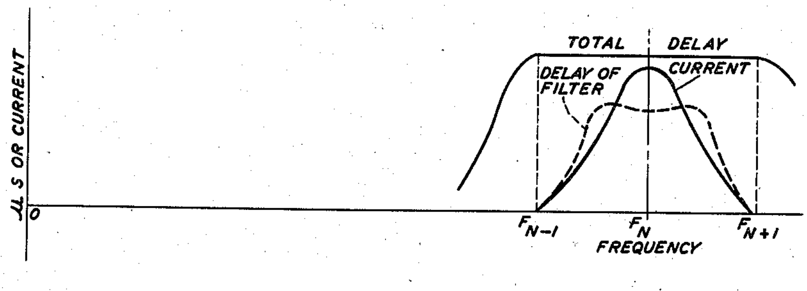
Fig. 10 is a graphical representation to aid in understanding the operation of the arrangement of Fig. 9.

The characteristics of the $n$th channel are graphically shown in Fig. 10, the characteristics of the various channels being similar. The current magnitude when plotted versus frequency has a maximum at $F_n$, the $n$th pilot frequency, and is preferably negligible at and beyond frequency $F_{n+1}$ and $F_{n-1}$ respectively corresponding to the pilot channels $n+1$ or $n-1$. The delay of the filter alone has "humps" as shown by the dash line curve of Fig. 10. It is for this reason that delay equalizers are included in each channel of the arrangement of Fig. 9 to make the delay constant over the transmitted frequency range of the channel. The total delay is the same for each channel in its transmitted frequency range. The resistance (151 . . . 160) in the output of each of the parallel-connected branches of the circuit of Fig. 10 can be varied. It is assumed that all impedances as seen from the resistances 151 . . . 160 have been adjusted to have zero angle which can be done by using constant K-type networks. Therefore these resistances 151 . . . 160 control the relative outputs of the channels without altering the delay or the shape of the amplitude versus frequency characteristics. When the resistances are set so that each channel transmits the same current magnitude at its mid-band frequency, and when the amplitude versus frequency characteristic of each channel above its mid-band frequency is complementary to that of the next higher channel below its mid-band frequency, then the over-all transmission versus frequency characteristic for the entire circuit of Fig. 9 will be flat from $F_1$ to the mid-band frequency of the highest channel. Gain or loss "humps" can next be inserted at will by varying the adjustable resistors 151 . . . 160 with no effect on the delay since all channels have the same constant delay. Where the numbers of channels in parallel is great there will be considerable loss due to the shunting effects of so many branches at each junction point. This may be reduced if necessary by the use of amplification and the subdivision of channels into groups, each with a separate amplifier if necessary. The resistors 151 . . . 160 can be thermistors operated by heaters similar to those in Fig. 5, if desired.

A combination of an equalizer of Fig. 9 with an equalizer which produces both delay and attenuation effects or delay effects only permits compensation of any desired delay or attenuation distortions, either separately or together.

In the circuit of Fig. 2 the delay distortion equalizer 52 (such as that shown in Fig. 5 or Fig. 9) is shown at the input to the amplifier 53 in order to prevent unfavorable phase relations from arising in the feedback circuit including the attenuation equalizer 56. It is intended that small incidental loss variations caused by the delay network be automatically compensated by the attenuation equalizer and incidental delay variations of the latter, if not too great be compensated for by the delay equalizers. By providing practically instantaneous controls using fast-acting thermistors in the variable networks, the two types of compensation can be made to cooperate simultaneously in producing over-all flat loss and delay versus frequency characteristics.

Figure 4:
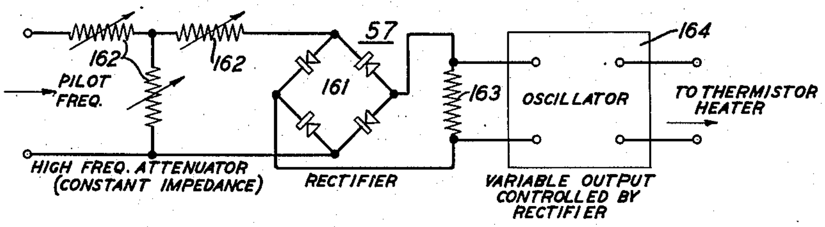
Fig. 4 is a circuit diagram of one of the control circuits forming part of the arrangement of Fig. 2.

Each of the control circuits 57 in branch A of the circuit of Fig. 2 can be of any suitable form. An example of one satisfactory circuit is shown in Fig. 4. In the arrangement of Fig. 4, each pilot frequency is applied to a rectifier 161 through a high frequency attenuator 162 having constant impedance. The output of the rectifier appearing across the resistor 163 is applied to any convenient form of oscillator 164 to control the variable output to heat any one of the thermistors 81, 82, 83 . . . 90. The connections in Fig. 4 should be poled so that a sudden increase in level of a pilot channel on the line causes the corresponding thermistor resistance to vary in a direction to increase the amount of negative feedback (through the attenuation equalizer 56) permitted at this frequency, until the level of the pilot frequency at the amplifier output is reduced to the former value. A similar procedure follows with opposite signs when the pilot level decreases.

The branch B of circuit shown in Fig. 2 includes a multiplicity of phase and level adjusters 58. A suitable manual level and phase adjuster is shown in Fig. 3. This comprises a high frequency attenuator 166, a shunt-connected inductance member 167 and variable capacitor member 168. The capacity 168 can be varied to produce the level and phase adjustment desired.

Figure 7:
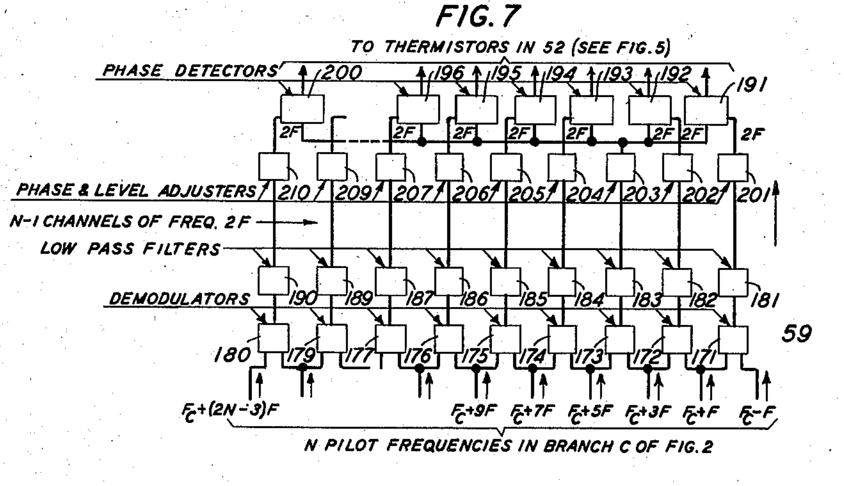
Fig. 7 is a schematic block diagram of control circuits which can be utilized in the arrangement of Fig. 2.
Figure 8:
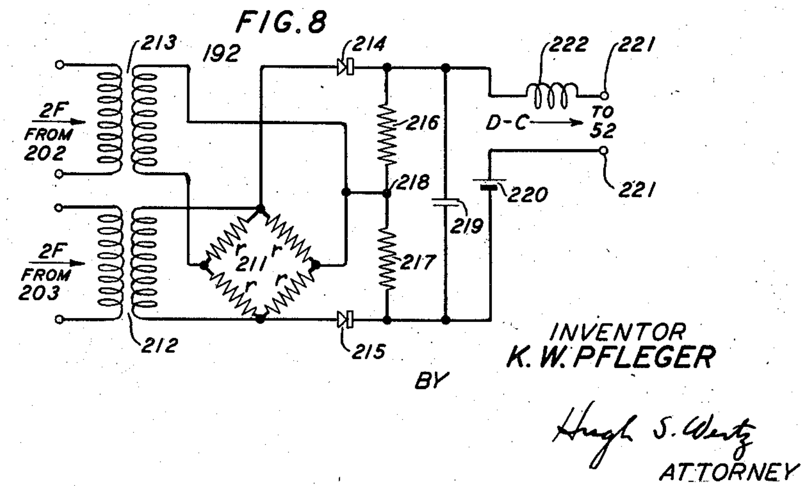
Fig. 8 is a circuit diagram of a phase detector which can be used in the control circuits of Fig. 7.

Reference will now be made to Fig. 7 which is a single line schematic diagram of a control circuit suitable for use in the path C of the circuit shown in Fig. 2, or, in other words, it can be used as the control circuit 59 of Fig. 2. Before describing the circuit arrangement of Fig. 7 it seems best to describe its function. Suppose the circuit has been lined up initially to have zero delay distortion. Suddenly the phases of the N pilot channels are shifted respectively by increments $\beta_1$, $\beta_2$, $\beta_3$, etc. where the subscript in each case denotes the number of the channel. It is assumed satisfactory if the automatic delay distortion compensator so operates that $\beta_2-\beta_1=\beta_3-\beta_2=\beta_4-\beta_3$, etc. because, with equally spaced pilot frequencies, this keeps $\Delta\beta/\Delta\omega$ a constant over the entire transmitted frequency range, where $\Delta\beta=\beta_2-\beta_1=\beta_3-\beta_2$, etc., and $\Delta\omega=2\pi 13230=4\pi F$. The use of $$\frac{\Delta\beta}{\Delta\omega}$$

to represent delay instead of $$\frac{d\beta}{d\omega}$$

is assumed satisfactory so long as wiggles in the line characteristic have a periodicity considerably greater than 2F. It is desirable that changes introduced by the delay adjuster 52 shall be gradual between pilot frequencies so that no sharp irregularities are introduced. It happens that when any two frequencies $f_1$ and $f_2$ beat together in a demodulator and the difference frequency is considered, any sudden phase increments in $f_1$ and $f_2$, such as $\beta_1$ and $\beta_2$, respectively, appear in the difference frequency as an increment equal to $\beta_2-\beta_1$. In order to provide a test for $\beta_2-\beta_1$, $\beta_3-\beta_2$, $\beta_4-\beta_3$, etc. the N pilot channels are connected to $N-11$ demodulators as in the arrangement of Fig. 7. These demodulators are designated by the reference characters 171, 172, 173, 174, 175, 176, 177 . . . 179, 180. At the outputs of the demodulators are low-pass filters 181, 182, 183, 184, 185, 186, 187 . . . 189, 190, and at the outputs of all of these filters the difference frequency, 2F, appears. In each channel, the phase shift is respectively equal (within a constant) to $\beta_2-\beta_1$, $\beta_3-\beta_2$, $\beta_4-\beta_3$, etc. In order to test these phase increments for equality they are compared to some standard, for example, to $\beta_4-\beta_3$ appearing at the output of low-pass filter 183, or in similar fashion, any other filter output can be selected. An accurate means of detecting phase shift is the 90-degree, push-pull detector shown in Fig. 8. A phase detector such as that shown in Fig. 8 is sensitive to .01 degree even when level changes occur in the two inputs of magnitude about one-half decibel. For the frequency interval $2F=13,230$ cycles, the envelope delay sensitivity is .0021 microsecond. In order to compare phase changes at the output of low-pass filter 183 with phase changes in the output of the other low-pass filters, $N-2$ phase detectors 191, 192, 193, 194, 195, 196 . . . 200 are arranged as shown in Fig. 7, each deriving one input from low-pass filter 183 and the other input from some other low-pass filter (181, 182, 184, 185, 186, 187 . . . 189 or 190). In tandem with these connections are connected $N-1$ manual phase and level adjusters 201, 202, 203, 204, 205, 206, 207 . . . 209, 210 so set that when no delay distortion exists on the line, the two inputs of each phase detector are 90 degrees apart, and the direct current output is then zero. (It is possible to omit the phase adjuster 203 if the others have sufficient range.)

The phase detector (192 for example) shown in Fig. 8 comprises a resistance bridge 211 across the upper and lower corners of which is applied one wave of frequency 2F from transformer 212 connected to one phase and level adjuster (201 to 210) of Fig. 7 and across the right and left corners of which is applied a wave of frequency 2F from transformer 213 connected to another one of the phase and level adjusters 201 to 210. The upper and lower corners are connected respectively to rectifiers 214 and 215. Between the positive terminals of these rectifiers is connected a series circuit comprising resistors 216 and 217 the common terminal 218 of which is connected to the right-hand corner of the bridge 211. Serially connected resistors 216 and 217 are shunted by a condenser 219. The operation of circuits like that shown in Fig. 8 is well known and will only be given a brief description here.

The current in the upper right arm of the bridge 211 is the vector sum of the two sinusoidal waves from sources 202 and 203, and the current in the lower right arm of the bridge 211 is the vector difference of these waves. When the magnitudes of the two inputs are equal, the vector sum may be expressed by $$E_S=2A\cos\frac{\theta}{2}$$

and the vector difference by $$E_D=2A\sin\frac{\theta}{2}$$

where A equals the magnitude constant of each component and $\theta$ equals the phase angle between them. Now the voltages impressed on rectifiers 214 and 215 are respectively proportional to the values Es and $E_D$, as are the rectified waves flowing in resistors 216 and 217. A low-pass filter consisting of shunt condenser 219 and series inductance 222 removes alternating components from the output wave flowing over conductors 221. Due to the differential combination of the voltages across 216 and 217 the open circuit output voltage across conductors 221 is proportional to $$\left(\cos\frac{\theta}{2}-\frac{\theta}{2}\right)$$

plus the voltage of a biasing battery 220. When $\theta=90$ degrees and a thermistor heater or load is connected to leads 221 the current flowing therein is due entirely to the voltage of battery 220. But if the two input voltages are not in 90-degree relationship the load current is increased or decreased by an amount proportional to $$\left(\cos\frac{\theta}{2}-\sin\frac{\theta}{2}\right)$$

Figure 6:
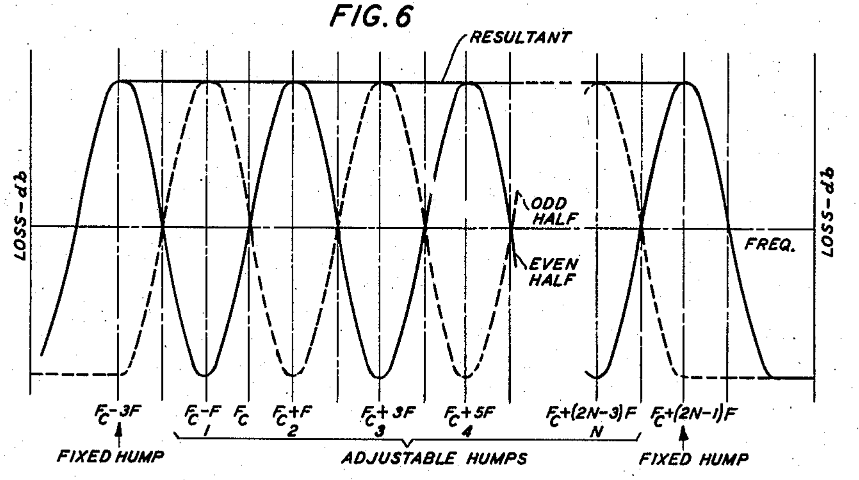
Fig. 6 is a graphical representation to aid in understanding the invention.

Returning again to the control circuit of Fig. 7, it will be noted that when $\beta_3-\beta_2\neq\beta_4-\beta_3$, there is a direct current component in the output from phase detector 192 superimposed upon the current from battery 220, so that the magnitude and direction of the superimposed component are respectively indications of the magnitude and sign of the inequality of the two phase increments. Consequently the resultant direct current in leads 221 serves as an indication of the amount of the required variable delay for compensation in the frequency region between $F_c+F$ and $F_c+3F$ in order to shift phases so that finally $\beta_3-\beta_2=\beta_4-\beta_3$. For example, suppose it is desired to increase $\beta_3-\beta_2$. A phase "hump" similar in shape to the attenuation "hump" in Fig. 6 with a peak at $F_c+3F$ shown by the dashed curve can be inserted by some suitable network. In terms of envelope delay $$\frac{d\beta}{d\omega}$$

this phase characteristic would have a delay "hump" at about $F_c+2F$. It is thus evident that the various phase detectors (191 to 200) are to control delay "humps" having peak values about mid-way between the associated pilot frequencies. Fig. 6 can be assumed to apply to desirable delay equalizers at average conditions if the "humps" are taken to denote phase shift instead of loss. It is obvious that as the device of this sort makes $\beta_3-\beta_2=\beta_4-\beta_3$, it also holds $$\beta_4-\beta_3=\beta_2-\beta_1=\beta_3-\beta_2=\beta_5-\beta_4=\beta_6-\beta_5$$

etc. The outputs of the phase detectors 191 to 200 can be used to control thermistors in the delay distortion equalizer 52 shown in Fig. 5.

In lining up and adjusting the apparatus, the relative phases of the power channel should be definitely adjusted at the sending end in such a manner as not to cause serious resultant peak values on the line. The sending arrangements should be stable so that this phase relationship remains fixed within about ±.01 degree in each case in order not to produce appreciable subsequent errors in regulation. For the same reason, the output levels of the pilot frequencies should remain constant within about ±.05 decibel. Consequently, temperature control of all filters and phase shifters is desirable and also stabilization of the harmonic generator 14. It is desirable to give all sending circuits the same adjustment throughout the plant so that they are readily interchangeable. The receiving arrangement of Fig. 2 is connected to the sending arrangement of Fig. 1 through zero line and the pilot channels and manual adjustments of the receiving arrangement are set so that complementary parts of the delay and loss adjusters give over-all flat characteristics. It is also important for certain parts of the receiving circuit to be kept at constant temperature and to be as stable as the sending circuits. After adjusting a receiving circuit it can be removed to its final destination. Each section of circuit to be controlled by the automatic device is first given as flat an adjustment of loss and delay as possible with the basic equalizers of the system before the automatic device is added. Consequently, straightaway loss and delay distortion measurements are desired. The narrow band-pass filters which separate the pilot channels from the television current should have high impedance to prevent unfavorable shunt loss and delay of the through transmission.

It is obvious that the amount of apparatus for one sending and one receiving circuit as shown in Figs. 1 and 2 is considerable. Reference is made to the parent application, Serial No. 786,745, for a list of this apparatus and for a description of a switching arrangement for reducing the amount of equipment required. Claims to the equalizer shown in Fig. 5 of the present application are contained in a copending application, Serial No. 105,517, filed July 19, 1949.

Obviously, various changes can be made in the equalizer described above without departing from the spirit of the invention.

What is claimed is:

1. An attenuation equalizer which produces substantially no delay distortion comprising a pair of input terminals, a pair of output terminals, and a plurality of parallel circuits connected between the input and the output terminals, respectively, each parellel circuit comprising a series connection of, in order, a band-pass filter adapted to pass a frequency band of constant width, but the various frequency bands for the respective filters being different, a delay equalizer to compensate for any delay produced by the filter, and a resistance, each filter having a loss vs. frequency characteristic which is substantially sinusoidal and is symmetrical around the tuned frequency of the filter and the intensity of the energy transmitted thereby determined by the value of said resistance.

2. An attenuation equalizer which produces substantially no delay distortion comprising a pair of input terminals, a pair of output terminals, and a plurality of parallel circuits connected between the input and the output terminals, respectively, each parallel circuit comprising a series connection of, in order, a band-pass filter adapted to pass a frequency band of constant width, but the various frequency bands for the respective filters being different, a delay equalizer to compensate for any delay produced by the filter, and a resistance, each filter having a loss vs. frequency characteristic which is substantially sinusoidal and is symmetrical around the tuned frequency of the filter and the intensity of the energy transmitted thereby determined by the value of said resistance, and means for varying the values of said resistances in response to individual control signals.

3. The combination of elements as in claim 2 in which said last-mentioned means includes a thermistor for each parallel circuit.

4. The attenuation equalizer of claim 1 in which the various band-pass filters are centered around odd-numbered frequencies in further combination with an attenuation equalizer as in claim 1 in which the various band-pass filters are centered around even-numbered frequencies.

KENNETH W. PFLEGER.

REFERENCES CITED

The following references are of record in the file of this patent:

UNITED STATES PATENTS

| Number | Name | Date |
|---|---|---|
| 1,932,435 | Aileen | Oct. 31, 1933 |
| 1,961,329 | Beers | June 5, 1934 |